United States Patent
Penna et al.

(10) Patent No.: US 9,755,717 B1
(45) Date of Patent: Sep. 5, 2017

(54) APPARATUS AND METHOD FOR CODEBOOK SEARCH FOR MULTIPLE-INPUT MULTIPLE-OUTPUT (MIMO) SYSTEM

(71) Applicant: Samsung Electronics Co., Ltd., Gyeonggi-do (KR)

(72) Inventors: Federico Penna, San Diego, CA (US); Hongbing Cheng, San Diego, CA (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/205,329

(22) Filed: Jul. 8, 2016

Related U.S. Application Data

(60) Provisional application No. 62/320,876, filed on Apr. 11, 2016.

(51) Int. Cl.
*H04B 7/04* (2017.01)
*H04B 7/06* (2006.01)
(Continued)

(52) U.S. Cl.
CPC ......... *H04B 7/0473* (2013.01); *H04B 7/0413* (2013.01); *H04B 7/0456* (2013.01);
(Continued)

(58) Field of Classification Search
CPC .. H04B 7/0456; H04B 7/0639; H04B 7/0473; H04B 7/0413; H04B 7/0417;
(Continued)

(56) References Cited

U.S. PATENT DOCUMENTS 8,121,235 B1   2/2012   Sun et al.
8,311,144 B1   11/2012  Sun et al.
(Continued)

FOREIGN PATENT DOCUMENTS

WO   WO2008021062   2/2008
WO   WO2013023291   3/2013
WO   WO2016024972   2/2016

OTHER PUBLICATIONS

J. Choi et al., Interpolation Based Unitary Precoding for Spatial Multiplexing MIMO-OFDM With Limited Feedback, IEEE, 2006.
(Continued)

*Primary Examiner* — Michelle M Koeth
(74) *Attorney, Agent, or Firm* — The Farrell Law Firm, P.C.

(57) ABSTRACT

A method for selecting a precoder from a codebook for a channel matrix H and an apparatus. The method includes determining, by a processor, a reference precoder V for the channel H and a phase rotation for V; for all codewords W from a codebook, determining, by the processor, phase rotations for W and phase distances based on differences between phases of elements of V and W; and selecting, by the processor, the codeword W with a minimum phase distance, wherein H has a size of $N_R \times N_T$, $N_R$ is a number of receive antennas, $N_T$ is a number of transmit antennas, V has a size of $N_T \times L$, and L is a number of data layers transmitted simultaneously.

20 Claims, 4 Drawing Sheets

(51) Int. Cl.
*H04B 7/0413* (2017.01)
*H04B 7/0456* (2017.01)

(52) U.S. Cl.
CPC ......... *H04B 7/0478* (2013.01); *H04B 7/0486* (2013.01); *H04B 7/0639* (2013.01); *H04B 7/0469* (2013.01); *H04B 7/0617* (2013.01); *H04B 7/0626* (2013.01)

(58) Field of Classification Search
CPC .. H04B 7/0617; H04B 7/0478; H04B 7/0626; H04B 7/0469; H04B 7/0486
See application file for complete search history.

(56) References Cited

U.S. PATENT DOCUMENTS

| | | |
|---|---|---|
| 8,594,220 B2 | 11/2013 | Bayesteh et al. |
| 8,897,386 B2 | 11/2014 | Yeh et al. |
| 8,948,104 B2 | 2/2015 | Clerckx et al. |
| 8,948,298 B2 | 2/2015 | Lee et al. |
| 8,976,839 B2 | 3/2015 | Chen et al. |
| 2015/0103933 A1* | 4/2015 | Nagata ............ H04B 7/0456 375/260 |
| 2016/0020837 A1 | 1/2016 | Schober et al. |

OTHER PUBLICATIONS

T. Tang, et al., "Mean Mutual Information Per Coded Bit based Precoding in MIMO-OFDM Systems,", IEEE, 2010.

\* cited by examiner

US 9,755,717 B1

APPARATUS AND METHOD FOR CODEBOOK SEARCH FOR MULTIPLE-INPUT MULTIPLE-OUTPUT (MIMO) SYSTEM

PRIORITY

This application claims priority under 35 U.S.C. §119(e) to a U.S. Provisional Patent Application filed on Apr. 11, 2016 in the United States Patent and Trademark Office and assigned Ser. No. 62/320,876, the entire contents of which are incorporated herein by reference.

FIELD

The present disclosure relates generally to communication systems, and more particularly, to an apparatus and method for codebook search for a multiple-input multiple-output (MIMO) system.

BACKGROUND

Modern cellular networks (e.g., long term evolution (LTE)) rely on multiple antennas, both at a base station (also referred to as an evolved node B (eNB) and at a mobile terminal (also referred to as a user equipment (UE)), in order to increase network capacity and data rate for users. A communication system with multiple antennas at a transmitter side and a receiver side is referred to as a MIMO system.

There has been a steady increase in the number of antennas in a MIMO system, especially at the eNB side, in an effort to achieve higher spatial multiplexing and diversity gains (which result in more data streams transmitted simultaneously and higher signal-to-noise ratios (SNRs) for the served users), as well as better coverage by forming narrow beams or virtual sectors in a cell. For example, the latest release of LTE (Release 13), in 2015, introduced the feature of "full dimension (FD)/elevation beamforming (EB) MIMO," whereby the eNB supports two dimensional (vertical and horizontal) antenna arrays with 8 transceiver units, which translates to 16 antenna ports (taking into account the polarization dimension) from the UE point of view.

The trend towards higher-dimensional MIMO systems is expected to continue with the next generation of cellular networks (e.g. 5G), which will likely support even larger antenna arrays. The performance of a MIMO communication system strongly depends on the selection of an appropriate precoding matrix to adapt a transmitted signal to a wireless channel. As a wireless channel is time-varying, it is essential to update a precoding matrix often enough to follow the channel variations. However, this requires feedback of channel state information (CSI) from a UE to an eNB. Hence, a trade-off must be determined between the conflicting requirements of frequent feedback (for better CSI accuracy) and limited feedback (so as to leave more bandwidth for data transmission). Practical systems such as LTE address this issue by specifying a pre-defined set of precoding matrices (also referred to as a codebook), known to both an eNB and a UE, so that the UE may select a certain matrix (also referred to as a codeword) from the codebook by indicating its index.

As the number of antennas and beamforming dimensions increase, the codebook size also increases. Therefore, it becomes increasingly challenging for the UE to efficiently search for the best candidate codeword in a codebook.

SUMMARY

According to one embodiment, a method includes determining, by a processor, a reference precoder V for a channel matrix H; determining, by the processor, a phase rotation for V; for all codewords W from a codebook, determining, by the processor, phase rotations for W and phase distances based on differences between phases of elements of V and W; and selecting, by the processor, the codeword W with a minimum phase distance, wherein H has a size of $N_R \times N_T$, $N_R$ is a number of receive antennas, $N_T$ is a number of transmit antennas, V has a size of $N_T \times L$, and L is a number of data layers transmitted simultaneously.

According to one embodiment, an apparatus includes a precoder processor configured to determine a precoder V for a channel matrix H; a first phase rotation processor configured to determine a phase rotation for V; a codeword reading processor configured to select codewords W from a codebook; a second phase rotation processor configured to determine phase rotations for W; a phase distance processor configured to determine phase distances based on differences between phases of elements of V and W; and a codeword selector configured to select a codeword with a minimum phase distance.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
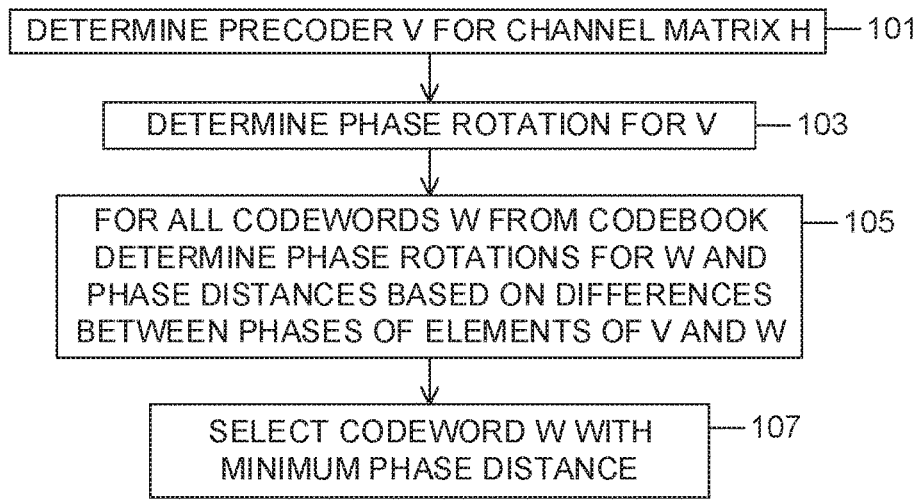
FIG. 1 is a flowchart of a method of selecting a codeword, according to an embodiment of the present disclosure.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope and spirit of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the spirit and the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Such terms as those defined in a generally used dictionary are to be interpreted to have the same meanings as the contextual meanings in the relevant field of art, and are not to be interpreted to have ideal or excessively formal meanings unless clearly defined in the present disclosure.

FIG. 1 is a flowchart of a method of selecting a codeword, according to an embodiment of the present disclosure. In an embodiment of the present disclosure, a MIMO system includes $N_T$ transmitting antennas at an eNB, $N_R$ receiving antennas at a UE, and has a rank L (i.e., has a capability to simultaneous transmit L layers of data).

Referring to FIG. 1, at 101, a processor determines a precoder V for a channel matrix H, where H has a size of $N_R \times N_T$ and $V=[v_1 \ldots v_L]$ has size $N_T \times L$. The precoder, or reference codeword, may be pre-determined based on a channel and may be considered "optimal" in some sense. The reference codeword may be obtained, for instance, by singular value decomposition (SVD) of the channel matrix H.

At 103, the processor determines a phase rotation for precoder V.

At 105 the processor determines phase rotations for each codeword W from a codebook, and a corresponding phase distance based on a difference between phases of elements of V and a respective W. Each codeword $W=[w_1 \ldots w_L]$ is a candidate codeword from a codebook $C_{N_T,L}$. The codewords may include elements of the form $$\frac{1}{\sqrt{LQ}} e^{j\theta},$$

where Q is a constant (i.e., a precoder matrix applies equal power across the $N_T$ transmit antennas). However, the present disclosure is not limited thereto.

A distance function is determined between a reference codeword V and a candidate codeword W. Since typical codebooks consist of unit-amplitude coefficients for each antenna (i.e., where precoding is performed in a phase domain only), the present disclosure uses a distance function that measures the difference between phases of candidate codewords and those of the reference codeword. This distance function is referred to as "phase distance." Compared to conventional distance functions, phase distance has lower per-candidate complexity. Therefore, more candidates may be evaluated by the receiver, thus increasing the probability of finding a high-performing codeword.

According to one embodiment, a distance between V and W with low complexity in hardware or digital signal processors (DSPs) is determined. The distance may be determined as a sum of phase differences between each element of V and the corresponding element of W.

According to one embodiment, V is a matrix having as columns L eigenvectors corresponding to L largest eigenvalues of $H^H H$. However, the present disclosure is not limited to V being an eigenvector matrix. In determining the phase distance between V and W, the eigenvectors $v_i$ may be defined up to an arbitrary constant phase offset, i.e., any matrix $V'=[v_1 e^{j\Phi_1} \ldots v_L e^{j\Phi_L}]$ with $\phi_1, \ldots, \phi_L \in [0, 2\pi)$ is a valid set of eigenvectors, which results in a same capacity as V. In addition, any column permutation of V is equivalent from a point of view of capacity (furthermore, this property is preserved even when the eigenvectors are normalized so as to have unit elementwise amplitude, and/or when the eigenvectors are rotated by an arbitrary common phase). However, when determining a codebook candidate that best approximates the phases of V, a different order of the columns of V may lead to different results.

According to one embodiment, a phase distance between V and W is determined as in Equation (1) as follows:

$$d_P(W, V) = \min_{\tilde{V} \in \Pi(V)} \min_{\phi_1} \ldots \min_{\phi_L} \sum_{i=1}^{N_T} \sum_{j=1}^{L} [(\angle w_{ij} \ominus \angle \tilde{v}_{ij}) \ominus \phi_j] \quad (1)$$

Based on the above, phase distance may be defined as a minimum among all possible phase offsets and all possible column permutations.

According to one embodiment, phase distance between V and W is determined as in Equation (2) as follows:

$$d_P(W, V) = \min_{\tilde{V} \in \Pi(V)} \sum_{i=1}^{N_T} \sum_{j=1}^{L} [(\angle w_{ij} - \angle w_{1j}) \ominus (\angle \tilde{v}_{ij} - \angle \tilde{v}_{1j})] \quad (2)$$

The phase distance of Equation (2) above is determined based on a heuristic that by construction of the codebooks of LTE Rel. 13 that $\angle w_{1j}=0 \; \forall j$, hence $\phi_j = \angle \tilde{v}_{1j}$, so the phase difference for a first antenna port is always zero.

According to one embodiment, phase distance between V and W is determined as in Equation (3) as follows:

$$d_P(W, V) = \min_{\tilde{V} \in \Pi(V)} \sum_{i=1}^{N_T} \sum_{j=1}^{L} [(\angle w_{ij} - \phi_{avg}(w_j)) \ominus (\angle \tilde{v}_{ij} - \phi_{avg}(\tilde{v}_j))] \quad (3)$$

where $\phi_{avg}(x)$ denotes an element-wise phase average of vector x, which may be determined for instance as $$\phi_{avg}(x) = \left( \frac{\sum_{k=1}^{N_T} \angle x_k}{N_t} \right)$$

mod $2\pi$. In Equations (1)-(3) above, $\pi(A)$ denotes all possible permutations of columns of a given matrix A, and $a \ominus b \doteq \min\{(a-b) \bmod 2\pi, (b-a) \bmod 2\pi\}$. In Equation (3) above, an average phase for each column is subtracted.

The number of permutations of V scales as $L! = L \cdot (L-1) \cdot \ldots \cdot 1$, which significantly increases search complexity as the rank L grows. However, the number of phase computations effectively scales as $L^2$, since individual phase distances may be pre-computed for all possible combinations of columns of V, where the results are then summed for the different combinations.

At 107, the processor selects the codeword W with a minimum phase distance. After phase distance $d_P$ is determined for all candidate codewords in a predefined set (i.e., the entire codebook or a subset thereof), a codeword that minimizes the phase distance $d_P$ may be selected as the precoder. In one embodiment, the codeword that minimizes the phase distance $d_P$ may be determined in Equation (4) as follows:

$$\hat{W} = \arg\min_{W} d_P(V, W). \quad (4)$$

Figure 2:
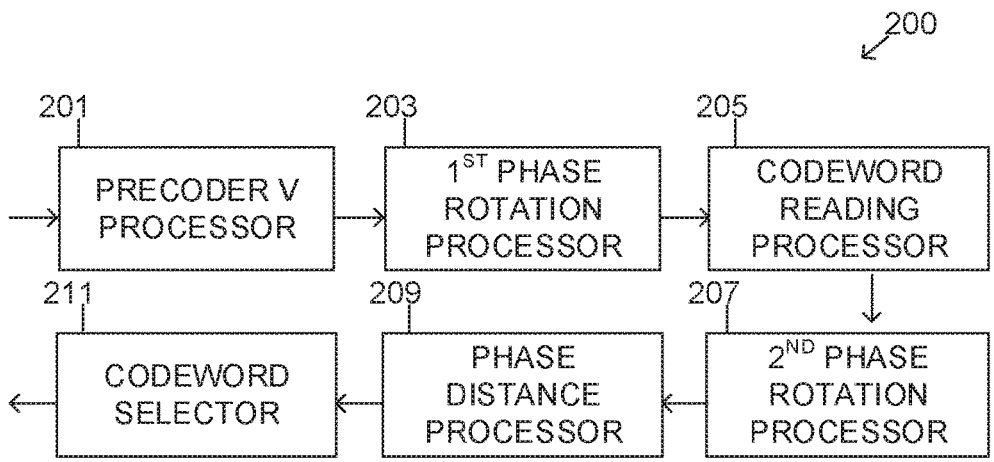
FIG. 2 is a block diagram of an apparatus for selecting a codeword, according to an embodiment of the present disclosure.

FIG. 2 is a block diagram of an apparatus 200 for selecting a codeword, according to an embodiment of the present disclosure.

Referring to FIG. 2, the apparatus 200 includes a precoder V processor 201, a first phase rotation processor 203, a codeword reading processor 205, a second phase rotation processor 207, a phase distance processor 209, and a codeword selector 211.

The precoder V processor 201 includes an input for receiving a channel matrix H, and an output for providing a precoder V for the channel matrix H. In an embodiment of the present disclosure, $V=[v_1 \ldots v_L]$ is an $N_T \times L$ matrix that represents a reference codeword. The precoder, or reference codeword, may be pre-determined based on a channel and may be considered "optimal" in some sense. The reference codeword may be obtained, for instance, by singular value decomposition (SVD) of the channel matrix H. In one embodiment, the codewords may include elements of the form $$\frac{1}{\sqrt{LQ}} e^{j\theta},$$

where Q is a constant (i.e., a precoder matrix applies equal power across the $N_T$ transmit antennas). However, the present disclosure is not limited thereto.

The first phase rotation processor 203 includes an input connected to the output of the precoder V processor 201, and an output for providing a phase rotation of V.

The codeword reading processor 205 includes an input connected to the output of the first phase rotation processor 204, and an output for providing codewords W read from a codebook, where each codeword $W=[w_1 \ldots w_L]$ is a candidate codeword from a codebook $C_{N_T,L}$.

The second phase rotation processor 207 includes an input connected to the output of the codeword reading processor 205, and an output for providing phase rotations of W.

The phase distance processor 209 includes an input connected to the output of the second phase rotation processor 207, and an output for providing phase distances determined based on differences between phases of elements of V and W. A distance function is determined between a reference codeword V and a candidate codeword W. Since typical codebooks consist of unit-amplitude coefficients for each antenna (i.e., where precoding is performed in a phase domain only), the present disclosure uses a distance function that measures the difference between phases of candidate codewords and those of the reference codeword. This distance function is referred to as "phase distance." Compared to conventional distance functions, phase distance has lower per-candidate complexity. Therefore, more candidates may be evaluated by the receiver, thus increasing the probability of finding a high-performing codeword.

The codeword selector 211 includes an input connected to the output of the phase distance processor 209, and an output for providing the selected precoder.

Figure 3:
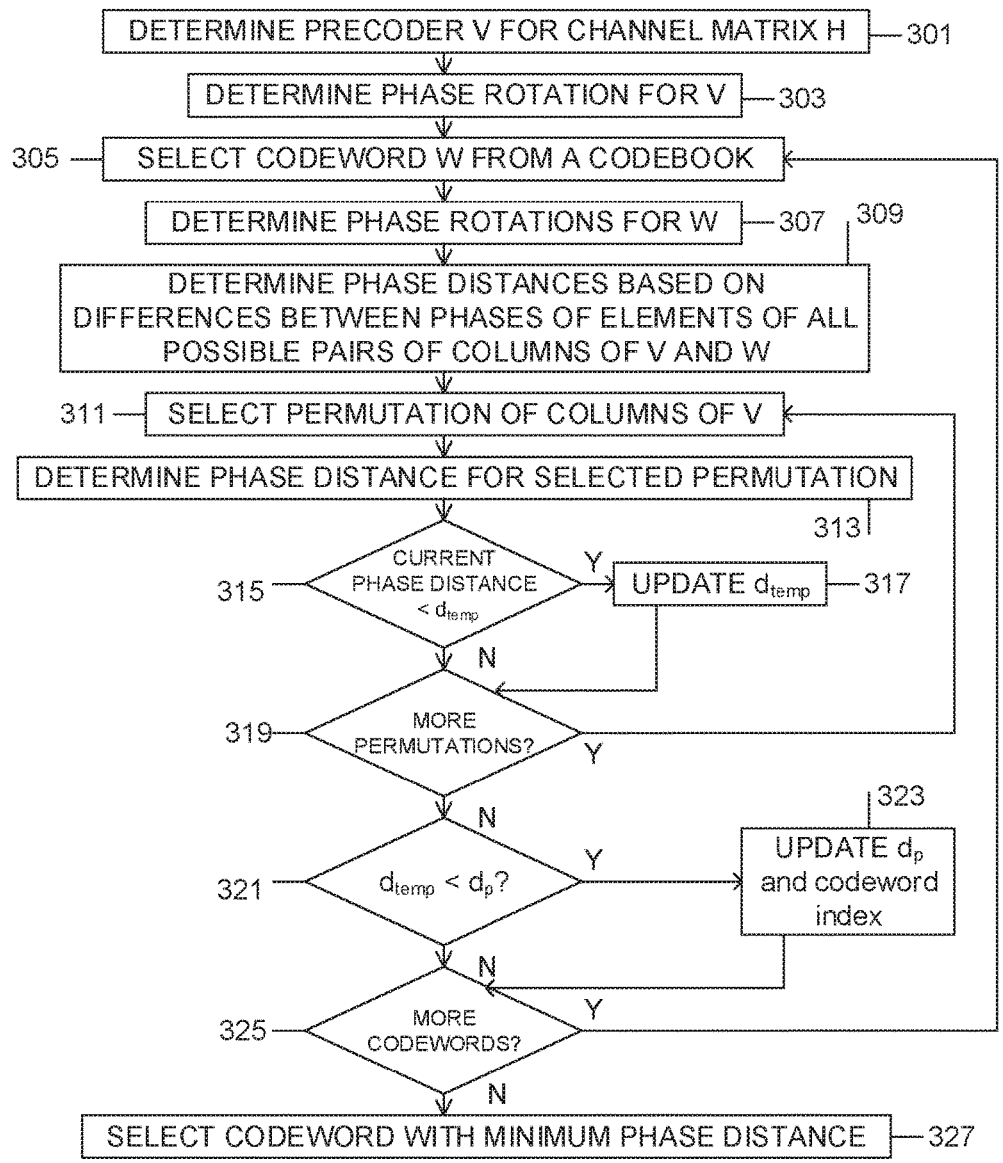
FIG. 3 is a flowchart of a method of selecting a codeword, according to an embodiment of the present disclosure.

FIG. 3 is a flowchart of a method of determining a codeword, according to one embodiment, where phase distance is determined as in Equation (2) above.

Referring to FIG. 3, the present system determines a precoder V (e.g., an optimal precoder) for a channel matrix H at 301.

At 303, the present system determines a phase rotation for V. In one embodiment, each column of V is rotated by a common phase equal to a negative of the phase of a first element of the column. Table 1 below includes an example of pseudocode for determining a phase rotation for V.

TABLE 1

For k = 1,...,L
$\phi_k = \angle v_{1k}$;
$v_{1k} = |v_{1k}|$;
For i = 2,...,$N_T$
$v_{ik} = v_{ik} \cdot e^{-j\phi_k}$;
End
End In one embodiment, the phase rotation for V may be determined as in Table 2 as follows:

TABLE 2

For k = 1, ..., L $$\phi_k = \left( \frac{1}{N_T} \sum_{i=1}^{N_T} \angle v_{ik} \right) \bmod 2\pi;$$

For i = 1, ..., $N_T$
$v_{ik} = v_{ik} \cdot e^{-j\phi_k}$;
End
End

At 305, the present system selects one codeword W from a codebook.

At 307, the present system determines phase rotations of W. In one embodiment, each column of W is rotated by a common phase equal to a negative of the phase of the first element of such column. In one embodiment, the phase rotation for W may be determined as in Table 3 below, which is the same as the phase rotation for V described above in Table 1:

TABLE 3

For k = 1,...,L
$\phi_k = \angle w_{1k}$;
$w_{1k} = |w_{1k}|$;
For i = 2,...,$N_T$
$w_{ik} = w_{ik} \cdot e^{-j\phi_k}$;
End
End In one embodiment, the phase rotation of W may be determined as in Table 4 below, which is the same as the phase rotation for V described above in Table 2:

TABLE 4

For k = 1, . . . , L $$\phi_k = \left(\frac{1}{N_T}\sum_{i=1}^{N_T} \angle w_{ik}\right) \bmod 2\pi;$$

For i = 1, . . . , $N_T$
$w_{ik} = w_{ik} \cdot e^{-j\phi_k}$;
End
End

At 309, the present system determines phase distances based on differences between phases of elements of all possible pairs of columns of V and W. In one embodiment, L×L distances between all pairs (k, l) of columns $v_k$ of V and $w_l$ of W are determined and stored in a memory. The $L^2$ distances may be determined as in Equation (5) as follows:

$$\Delta_{kl} = \sum_{i=1}^{N_T} v_{ik} \ominus w_{il} \quad (5)$$

where a $\ominus$ b $\doteq$ min{(a−b)mod 2π, (b−a)mod 2π}, and Δ is a real L×L matrix where the distances are stored.

At 311, the present system selects one permutation of the columns of V.

At 313, the present system determines a phase distance of the selected permutation of the columns of V. In one embodiment, individual phase distances stored in a matrix Δ are combined according to Equation (6) as follows, where V and W in Equation (6) below are modified by the common phase rotation:

$$d(V, W) = \sum_{k=1}^{L} \Delta_{p_k, k} \quad (6)$$

where $p_k$ is a k-th element of a vector p, which is one possible permutation of {1, . . . , L}. For example, if L=3, a possible permutation is p={2,3,1}, and in this case the distance is calculated as d(V,W)=$\Delta_{21}$+$\Delta_{32}$+$\Delta_{13}$.

At 315, the present system determines whether a current phase distance is less than a temporary phase distance $d_{temp}$. In one embodiment, the phase distance d(V,W) is compared to $d_{temp}$. In the first cycle of the method of FIG. 3, the current phase distance is the first phase distance determined. In subsequent cycles, the current phase distance is the phase distance determined in that cycle.

At 317, the present system updates $d_{temp}$ (which corresponds to the minimization over π(V) in Equation (2) above), if it is determined that the phase distance d(V,W) is less than $d_{temp}$.

At 319, the present system determines whether there are more permutations of the columns of V to process. If there are more permutations of the columns of V to process, the present system returns to select a subsequent permutation of the columns of V at 311.

At 321, If there are no more permutations of the columns of V to process, the present system determines whether $d_{temp}$ for a given codeword W is less than a best distance $d_P$ obtained with the codewords searched so far at 321.

If $d_{temp}$ is less than $d_P$, the present system updates $d_P$ and the codeword index (which corresponds to the minimization over W in Equation (2) above) at 323.

If $d_{temp}$ is not less than $d_P$, the present system determines whether there are more codewords in the codebook at 325. If there are more codewords, the present system returns to select a subsequent codeword from the codebook at 305.

If there are no more codewords, the present system selects a codeword with the minimum phase distance $d_P$ at 327, as a result of the cycle at 321, 323, and 325. More specifically, the selected codeword may be the one with an index given at 323 at the end of the cycle, which corresponds to Equation (4) above. However, the present disclosure is not limited thereto, and other methods of determining a codeword with the minimum phase distance $d_P$ may be used.

Figure 4:
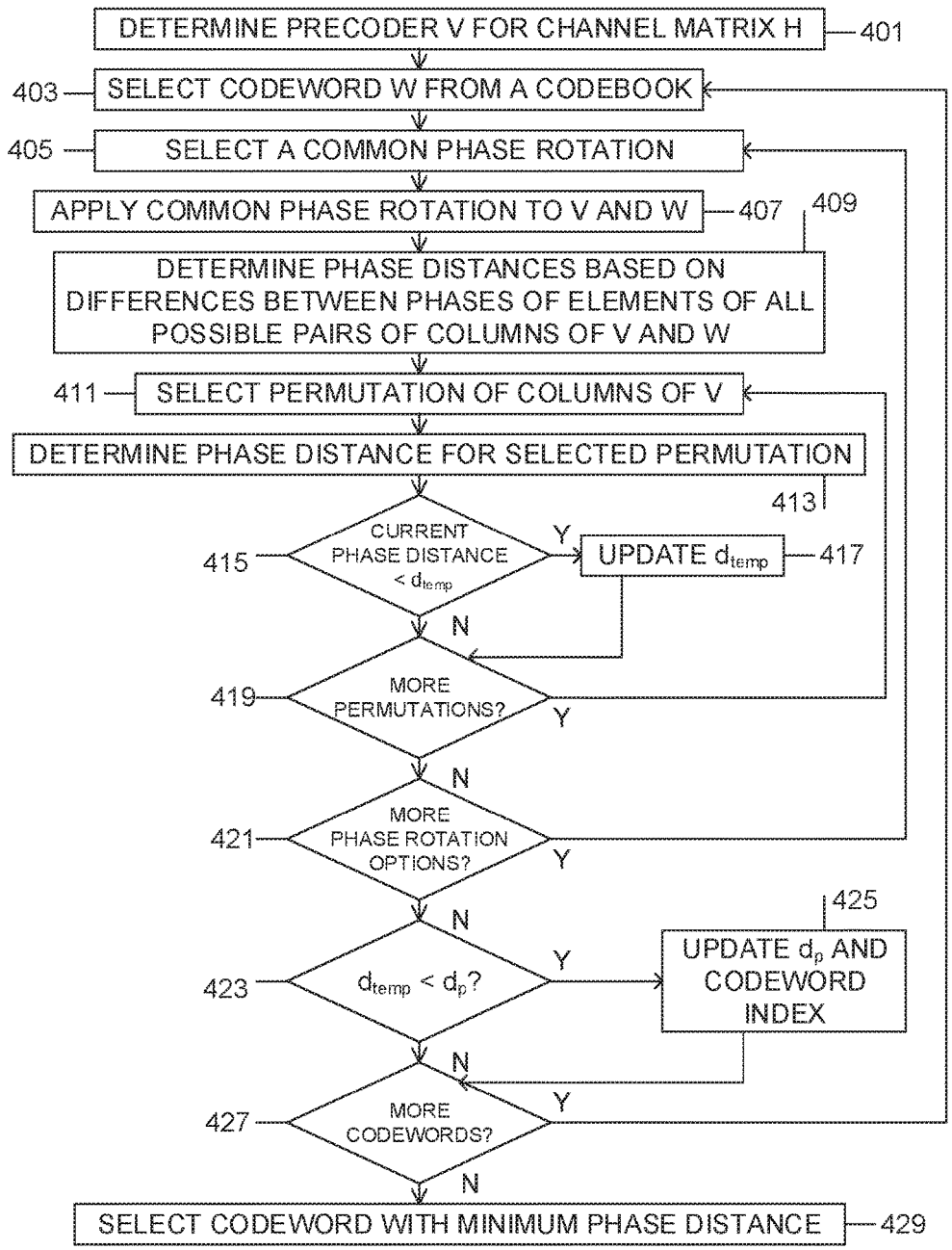
FIG. 4 is a flowchart of a method of selecting a codeword, according to an embodiment of the present disclosure.

FIG. 4 is a flowchart of a method of selecting a codeword, according to an embodiment of the present disclosure, where phase distance is determined as in Equation (1) above. In FIG. 4, different phase rotation options are searched. Each rotation option includes a set of phases {$\phi_1$, . . . $\phi_L$}, which may be selected, for example, from a uniform grid, or derived from heuristics or certain design considerations.

Referring to FIG. 4, at 401, the present system determines an optimal precoder V.

At 403, the present system selects a codeword W from a codebook.

At 405, the present system selects a common phase rotation.

At 407, the present system applies the selected common phase rotation to V and W.

At 409, the present system determines phase distances based on differences between phases of elements of all possible pairs of columns of V and W. In one embodiment, L×L distances between all pairs (k, l) of columns $v_k$ of V and $w_l$ of W are determined and stored in a memory. The L×L distances may be determined as in Equation (5) above.

At 411, the present system selects one permutation of the columns of V.

At 413, the present system determines a phase distance for the selected permutation of the columns of V, using a combination of the pairwise distances precomputed at 409. In one embodiment, pairwise distances are stored in a matrix Δ and are combined according to Equation (6) above.

At 415, the present system determines whether a current phase distance is less than a temporary phase distance $d_{temp}$. In one embodiment, the phase distance d(V,W) is compared to $d_{temp}$. In the first cycle of the method of FIG. 4, the current phase distance is the first phase distance determined. In subsequent cycles, the current phase distance is the phase distance determined in that cycle.

If the phase distance d(V,W) is less than $d_{temp}$, the present system updates $d_{temp}$ (which corresponds to the minimization over π(V) and over $\phi_1$ . . . $\phi_L$. in Equation (1) above) at 417.

If the phase distance d(V,W) is not less than $d_{temp}$, the present system returns to select a subsequent permutation of the columns of V at 411.

If there are no more permutations of the columns of V to process, the present system determines whether there are more phase rotation options to process. If there are more phase rotation options, the present system returns to select a subsequent common phase rotation at 421.

If there are no more phase rotation options, the present system determines whether $d_{temp}$ for a given codeword W is less than a best distance $d_P$ obtained with the codewords searched so far.

If $d_{temp}$ is less than $d_P$, the present system updates, $d_P$ and the codeword index (which corresponds to the minimization over W in Equation (1) above) at 425.

If $d_{temp}$ is not less than $d_P$, the present system determine whether there are more codewords to process at 427.

If there are no more codewords, the present system selects a codeword with the minimum phase distance $d_P$ at 429, as a result of the cycle at 423, 425, and 427. More specifically, the selected codeword may be the one with an index given at 425 at the end of the cycle, which corresponds to Equation (4) above. However, the present disclosure is not limited thereto, and other methods of determining a codeword with the minimum phase distance $d_P$ may be used.

Figure 5:
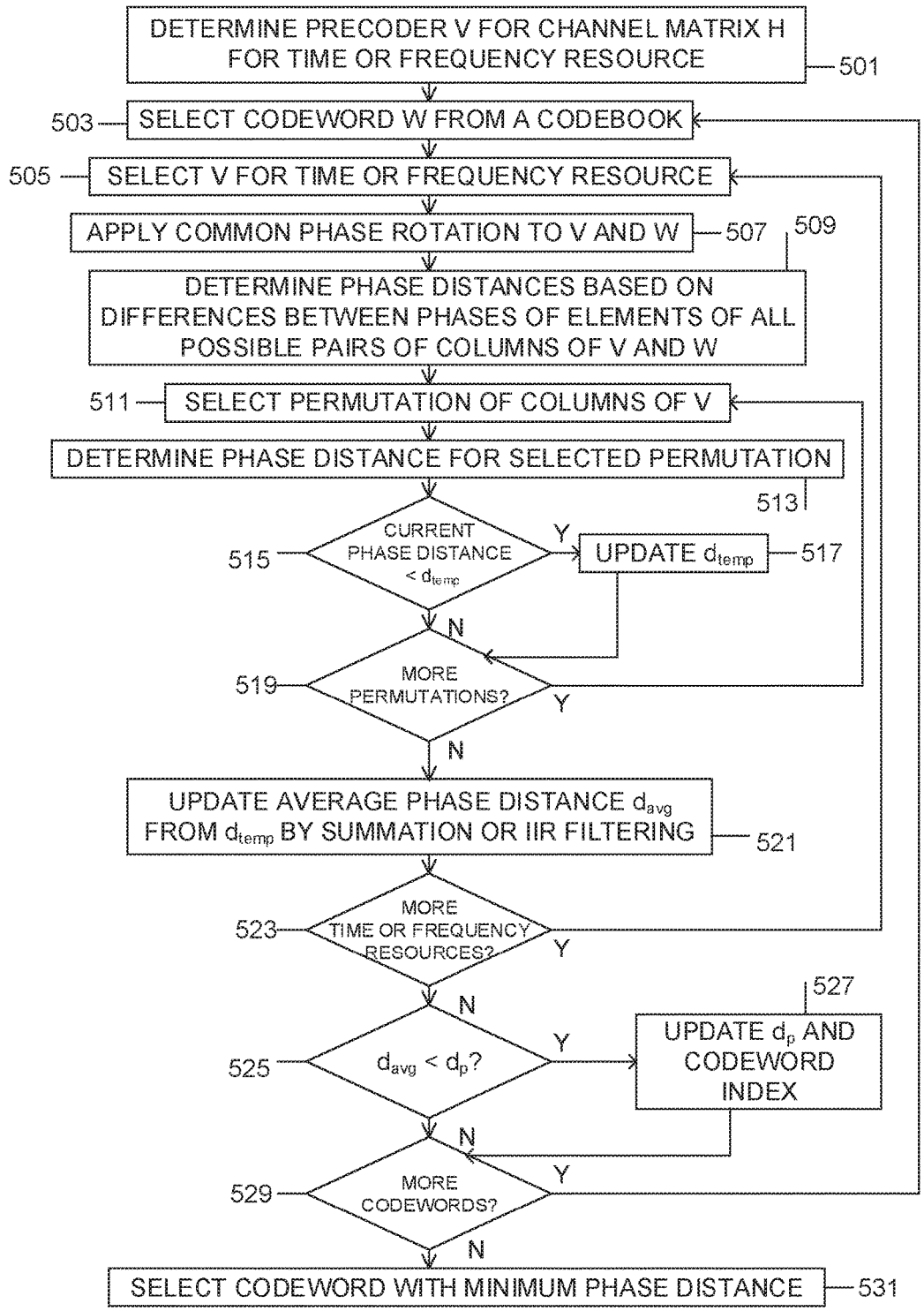
FIG. 5 is a flowchart of a method of selecting a codeword, according to an embodiment of the present disclosure.

FIG. 5 is a flowchart of a method of selecting a codeword, according to an embodiment of the present disclosure. A phase distance $d_{temp}$ (obtained after search over permutations of V) may be averaged over multiple time or frequency domain resources (e.g., orthogonal frequency division multiplexing (OFDM) symbols or subcarriers). In one embodiment, the phase distance $d_{temp}$ may be averaged over multiple time or frequency domain resources by summation or infinite impulse response (IIR) filtering. However, the present disclosure is not limited thereto, and other methods of averaging phase distance $d_{temp}$ over multiple time or frequency domain resources may be used in the present disclosure.

Referring to FIG. 5, a loop over time or frequency resources is nested inside of a loop over codewords W, and optimal precoders V as all the considered time or frequency resources may be pre-computed and stored. However, in one embodiment of the present disclosure, the nesting of the two loops may be switched. In this case, the precoders V need not be stored. Instead, a minimum total phase distance $d_{tot}(W) = \Sigma_{n=1}^{N_{TD}} \Sigma_{m=1}^{N_{FD}} d_{avg}(W)$ obtained for each candidate W is stored, and then another search is performed over W to determine the precoder, where the precoder may be determined as $$\hat{W} = \arg\min_{W} d_{tot}(W).$$

At 501, the present system determines a reference precoder V for all of the considered time or frequency resources for a channel matrix H.

At 503, the present system selects a codeword W is selected from a codebook.

At 505, the present system selects V for the considered time or frequency resource.

At 507, the present system applies a common phase rotation V and W.

At 509, the present system determines phase distances based on differences between phases of elements of all possible pairs of columns of V and W. In one embodiment, L×L distances between all pairs (k, l) of columns $v_k$ of V and $w_l$ of W are determined and stored in a memory. The L×L distances may be determined as in Equation (5) above.

At 511, the present system selects one permutation of the columns of V.

At 513, the present system determines a phase distance of the selected permutation of the columns of V. In one embodiment, individual phase distances stored in a matrix Δ are combined according to Equation (6) above.

At 515, the present system determines whether a current phase distance is less than a temporary phase distance $d_{temp}$. In one embodiment, the phase distance d(V,W) is compared to $d_{temp}$. In the first cycle of the method of FIG. 5, the current phase distance is the first phase distance determined. In subsequent cycles, the current phase distance is the phase distance determined in that cycle.

If the phase distance d(V,W) is less than $d_{temp}$, the present system updates $d_{temp}$ (which corresponds to the minimization over π(V) in Equation (7) below) at 517.

If the phase distance d(V,W) is not less than $d_{temp}$, the present system determines whether there are more permutations of the columns of V to process at 519. If there are more permutations, the present system returns to select a subsequent permutation at 511.

If there are no more permutations, the present system updates an average phase distance $d_{avg}$ from $d_{temp}$ by summation or IIR filtering.

At 523, the present system determines whether there are more time or frequency resources to process. If there are more time or frequency resources, the present system returns to select a subsequent V for a subsequent time or frequency resource at 505.

If there are no more time or frequency resources to process, the present system determines whether $d_{avg}$ for a given codeword W is less than a best distance $d_P$ obtained with the codewords searched so far at 525.

If $d_{avg}$ is less than $d_P$, the present system updates $d_P$ and the codeword index (which corresponds to the minimization over W in Equation (7) below) at 527.

If $d_{avg}$ is not less than $d_P$, the present system determines whether there are more codewords to process at 529. If there are more codewords, the present system returns to select a subsequent codeword from the codebook at 503.

If there are no more codewords, the present system selects a codeword with the minimum phase distance $d_P$ at 531, as a result of the cycle at 525, 527, and 529. More specifically, the selected codeword may be the one with an index given at 529 at the end of the cycle, which corresponds to Equation (4) above. However, the present disclosure is not limited thereto, and other methods of determining a codeword with the minimum phase distance $d_P$ may be used.

Depending on the feedback periodicity, the distance metric may be averaged in time and/or frequency domain. In this case, the selection may be made according to Equation (7) as follows:

$$\hat{W} = \arg\min_{W} \sum_{n=1}^{N_{TD}} \sum_{m=1}^{N_{FD}} d_P(V_{n,m}, W) \tag{7}$$

where $N_{TD}$ and $N_{FD}$ are, respectively, the number of resources to be averaged in the time domain (e.g., OFDM symbols) and the frequency domain (e.g., subcarriers), and $V_{n,m}$ is the optimal precoder corresponding to the channel at time n and frequency m. In one embodiment, the averaging operation may also be performed by infinite impulse response (IIR) filtering or another method. However, the present disclosure is not limited thereto. Any method for averaging a distance function in the time domain and/or the frequency domain may be used in the present disclosure.

In one embodiment, phase distance between V and W is determined as in Equation (8) as follows:

$$d_P(W, V) = \min_{\tilde{V} \in \prod(V)} f_2\left(\sum_{i=1}^{N_T} \sum_{j=1}^{L} f_1^{ij}[d(\angle w_{ij}, \angle \tilde{v}_{ij})]\right) \quad (8)$$

wherein $f_1$ and $f_2$ are each selected from one of a linear function and a non-linear function, and wherein $N_T$ is a number of transmitting antenna, L is a rank, $v_{ik}$ is an element of V in an $N_T \times L$ matrix, $w_{ik}$ is an element of W in an $N_T \times L$ matrix, $\pi(A)$ denotes all possible permutations of columns of a given matrix A, and $d(x,y)$ denotes a difference between two phases x and y with a common phase rotation.

In one embodiment, $f_1$ and $f_2$ are two functions, where a weighted sum of $f_1$ and $f_2$ is a linear function (e.g., a weighted sum realized by choosing $f_1^{ij}(x)=a_{ij}x$ and $f_2(x)=x$, which are both linear functions).

In another embodiment, the sum in the complex domain is a non-linear function (e.g., a sum realized by choosing $f_1^{ij}(x)=e^{\iota x} \forall i,j$, wherein $\iota$ is an imaginary unit, and $f_2(x)=\angle x$, which are both non-linear functions). $f_1^{ij}:\mathbb{R} \rightarrow \mathbb{C}$, and $f_2: \mathbb{C} \rightarrow \mathbb{R}$ are two functions. $f_1$ may be selected from one of a linear function and a non-linear function, where the linear function includes $f_1^{ij}(x)=a_{ij}x$ with $a_{ij} \in \mathbb{R}$ and $\mathbb{R}$ is a real number, and the non-linear function includes $f_1^{ij}(x)=e^{\iota x}\forall_{i,j}$, wherein $\iota$ is the imaginary unit. $f_2$ may be selected from one of a linear function and a non-linear function, where the linear function includes $f_2(x)=x$, and the non-linear function includes $f_2(x)=\angle x$.

In one embodiment, $d_P(W,V)$ of Equation (8) above may be a weighted sum. For example, phase distance between V and W may be determined as in Equation (8) above, where $f_1^{ij}(x)=a_{ij}x$ with $a_{ij} \in \mathbb{R}$ and $f_2(x)=x$. However the present disclosure is not limited thereto.

In one embodiment, $d_P(W,V)$ of Equation (8) may be a sum in the complex domain. For example, phase distance between V and W may be determined as in Equation (8) above, where $f_1^{ij}(x)=e^{\iota x}\forall i,j$, where $\iota$ is the imaginary unit, and $f_2(x)=\angle x$. However the present disclosure is not limited thereto.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for selecting a precoder from a codebook to adapt a transmitted signal to a wireless channel, given a channel matrix H, comprising:
    determining, by a processor, a reference precoder V for the channel matrix H;
    determining, by a processor, a phase rotation for V;
    for each codeword W from a plurality of codewords in the codebook, determining, by the processor, phase rotations for W and phase distances between phases of each element of V and the corresponding element of W, and determining a sum of the phase distances for each W; and
    selecting, by the processor, the precoder as the codeword W with a minimum phase distance being the smallest sum of phase distances from among all of the determined sums of phase distances, wherein H has a size of $N_R \times N_T$, $N_R$ is a number of receive antennas, $N_T$ is a number of transmit antennas, V has a size of $N_T \times L$, and L is a number of data layers transmitted simultaneously.

2. The method of claim 1, wherein the determining the reference precoder V for the channel matrix H comprises determining, by the processor, the precoder V for the channel matrix H by singular value decomposition.

3. The method of claim 1, wherein determining, by the processor, the phase rotation for V comprises determining the phase rotation for V from one of rotating each column of V by a negative of the phase of one element of the column of V and rotating each column of V by a negative of an average phase of the elements of the column of V.

4. The method of claim 1, wherein determining, by the processor, the phase rotation for W comprises determining the phase rotation for W from one of rotating each column of W by a negative of the phase of one element of the column of W and rotating each column of W by a negative of an average phase of the elements of the column of W.

5. The method of claim 1, wherein for all codewords W from the codebook, the sum of phase distances between phases of elements of V and W is determined after rotating each column of V by a negative of the phase of a first element of the column of V, and after rotating each column of W by a negative of the phase of a first element of the column of W.

6. The method of claim 1, wherein for all codewords W from the codebook, the sum of phase distances between phases of elements of V and W is determined where the phase distance between the phases of any two elements $v_{ij}$ and $w_{ij}$ is further rotated by a column-specific phase rotation $\phi_j$.

7. The method of claim 1, wherein for all codewords W from the codebook, the sum of phase distances between phases of elements of V and W is determined after rotating each column of V by a negative of the phase of a first element of the column of V, and after rotating each column of W by a negative of an average phase of the elements of the column of W.

8. The method of claim 1, wherein for all codewords of W from the codebook, the determining, by the processor, the sum of phase distances between V and W comprises determining:

$$d_P(W, V) = \min_{\tilde{V} \in \prod(V)} f_2\left(\sum_{n=1}^{N_T} \sum_{j=1}^{L} f_1^{ij}[d(\angle w_{ij}, \angle \tilde{v}_{ij})]\right)$$

wherein $f_1$ and $f_2$ are each selected from one of a linear function and a non-linear function, and wherein $N_T$ is a number of transmitting antennas, L is a rank, $v_{ij}$ is an element of V in an $N_T \times L$ matrix, $w_{ij}$ is an element of W in an $N_T \times L$ matrix, $\pi(A)$ denotes all possible permutations of columns of a given matrix A, and $d(x,y)$ denotes a difference between two phases x and y with a common phase rotation.

9. The method of claim 1, further comprising averaging, by the processor, the phase distances in a time domain and a frequency domain, wherein the codeword is selected as follows:

$$\hat{W} = \underset{W}{\operatorname{argmin}} \sum_{n=1}^{N_{TD}} \sum_{m=1}^{N_{FD}} d_p(V_{n,m}, W),$$

where $N_{TD}$ and $N_{FD}$ are numbers of resources to be averaged in the time domain and the frequency domain, respectively, and $V_{n,m}$ is an optimal precoder corresponding to a channel at time n and frequency m, and where averaging phase distance is performed by summation or infinite impulse response (IIR) filtering.

10. The method of claim 1, wherein selecting, by the processor, the codeword with the minimum phase difference is determined as follows:

$$\hat{W} = \operatorname{argmin}_W d_p(V, W),$$

where $d_p(V,W)$ is the difference in phase between the elements of V and W.

11. An apparatus, in a Multiple-In Multiple-Out (MIMO) system, to select a precoder from a codebook to adapt a transmitted signal to a wireless channel, comprising:
a precoder processor configured to determine a precoder V for a channel matrix H;
a first phase rotation processor configured to determine a phase rotation for V;
a codeword reading processor configured to select codewords W from a codebook;
a second phase rotation processor configured to determine phase rotations for W;
a phase distance processor configured to determine, for each codeword of the codewords W, phase distances between phases of each element of V and the corresponding element of W, and to determine a sum of the phase distances for each W; and
a codeword selector configured to select the precoder as a codeword from the codewords W, with a minimum phase distance being the smallest sum of phase distances from among all of the determined sums of phase distances.

12. The apparatus of claim 11, wherein the precoder processor is further configured to determine the precoder V for the channel matrix H by singular value decomposition.

13. The apparatus of claim 11, wherein the first phase rotation processor is further configured to determine the phase rotation for V from one of rotating each column of V by a negative of the phase of one element of the column of V and rotating each column of V by a negative of an average phase of the elements of the column of V.

14. The apparatus of claim 11, wherein the second phase rotation processor is further configured to determine the phase rotations for W from one of rotating each column of W by a negative of the phase of one element of the column of W and rotating each column by the negative of the average phase of the elements of such column.

15. The apparatus of claim 11, wherein the phase distance processor is further configured to determine the phase distances based on differences between phases of elements of V and W after rotating each column of V by a negative of the phase of a first element of the column of V, and after rotating each column of W by a negative of the phase of a first element of the column of W.

16. The apparatus of claim 11, wherein the phase distance processor is further configured to determine phase distances based on differences between phases of elements of V and W, where the difference between the phases of any two elements $v_{ij}$ and $w_{ij}$ is further rotated by a column-specific phase rotation $\phi_j$.

17. The apparatus of claim 11, wherein the phase distance processor is further configured to determine the phase distances based on differences between phases of elements of V and W after rotating each column of V by a negative of the phase of a first element of the column of V, and after rotating each column of W by a negative of an average phase of the elements of the column of W.

18. The apparatus of claim 11, wherein the phase distance processor is further configured to determine the phase distances based on differences between phases of elements of V and W as follows:

$$d_p(W, V) = \min_{\tilde{V} \in \Pi(V)} f_2 \left( \sum_{n=1}^{N_T} \sum_{j=1}^{L} f_1^{ij}[d(\angle w_{ij}, \angle \tilde{v}_{ij})] \right)$$

wherein $f_1$ and $f_2$ are each selected from one of a linear function and a non-linear function, and wherein $N_T$ is a number of transmitting antennas, L is a rank, $v_{ij}$ is an element of V in an $N_T \times L$ matrix, $w_{ij}$ is an element of W in an $N_T \times L$ matrix, $\pi(A)$ denotes all possible permutations of columns of a given matrix A, and $d(x,y)$ denotes a difference between two phases x and y with a common phase rotation.

19. The apparatus of claim 11, wherein the phase distance processor is further configured to average the phase distances in a time domain and a frequency domain, and the precoder selector is further configured to select the precoder as follows:

$$\hat{W} = \underset{W}{\operatorname{argmin}} \sum_{n=1}^{N_{TD}} \sum_{m=1}^{N_{FD}} d_p(V_{n,m}, W),$$

where $N_{TD}$ and $N_{FD}$ are numbers of resources to be averaged in the time domain and the frequency domain, respectively, and $V_{n,m}$ is an optimal precoder corresponding to a channel at time n and frequency m, and where averaging the phase distances is performed by summation or infinite impulse response (IIR) filtering.

20. The apparatus of claim 11, wherein the codeword selector is further configured to select the codeword with the minimum phase difference as follows:

$$\hat{W} = \operatorname{arg\,min}_W d_p(V,W),$$

where $d_p(V,W)$ is the difference in phase between the elements of V and W.

* * * * *